(12) United States Patent
Geiger

(10) Patent No.: US 11,889,825 B1
(45) Date of Patent: Feb. 6, 2024

(54) FISHING POLE ORGANIZER

(71) Applicant: Jurgen Geiger, Windhoek (NA)

(72) Inventor: Jurgen Geiger, Windhoek (NA)

(73) Assignee: DEX Organizer Company, LLC, Signal Mountain, TN (US)

( * ) Notice: Subject to any disclaimer, the term of this patent is extended or adjusted under 35 U.S.C. 154(b) by 457 days.

(21) Appl. No.: 16/834,925

(22) Filed: Mar. 30, 2020

Related U.S. Application Data

(60) Provisional application No. 62/826,379, filed on Mar. 29, 2019.

(51) Int. Cl.
*A01K 97/10* (2006.01)
*A47B 81/00* (2006.01)

(52) U.S. Cl.
CPC .......... *A01K 97/10* (2013.01); *A47B 81/005* (2013.01)

(58) Field of Classification Search
CPC ...... A01K 97/10; A01K 97/08; A47B 81/005; A47F 7/0021; A47F 7/0035; A47F 7/0028; B60R 9/08
USPC .......................................... 211/70.8; 224/406
See application file for complete search history.

(56) References Cited

U.S. PATENT DOCUMENTS

| | | | | |
|---|---|---|---|---|
| 1,904,067 A | * | 4/1933 | McGehee | A47F 7/0035 33/8 |
| 2,258,858 A | * | 10/1941 | Meadowcroft | E04C 2/322 428/603 |
| 3,394,514 A | * | 7/1968 | Lindner | E04B 5/29 52/448 |
| 3,528,391 A | * | 9/1970 | Johnson | A01K 1/0151 256/17 |
| 3,537,595 A | * | 11/1970 | Mathisen | A47B 81/005 211/89.01 |
| 3,555,762 A | | 1/1971 | Costanzo | |
| 3,696,920 A | * | 10/1972 | Lahay | A61B 50/30 206/370 |
| 3,722,473 A | * | 3/1973 | Vickstrom | A01K 1/0151 119/529 |
| 3,722,474 A | | 3/1973 | Vickstrom | |
| 3,876,076 A | * | 4/1975 | Hazelhurst | A01K 97/08 211/4 |
| 4,003,612 A | * | 1/1977 | Munsell | A01K 97/08 43/25 |
| 4,056,220 A | * | 11/1977 | Trimble | B63B 32/83 224/406 |
| 4,085,557 A | | 4/1978 | Tharp | |

(Continued)

FOREIGN PATENT DOCUMENTS

KR 101738609 B1 * 6/2017

*Primary Examiner* — Devin K Barnett
(74) *Attorney, Agent, or Firm* — John Rizvi; John Rizvi, P.A.—The Patent Professor®

(57) ABSTRACT

A fishing pole organizer for storing and organizing one or more fishing poles on a boat deck includes a plurality of elongated channel members arranged in side-by-side and spaced-apart relationship with one another defining a plurality of upwardly directed channels, wherein each upwardly directed channel is formed between adjacent channel members and is configured to receive a fishing pole therein. The elongated channel members may include a planar top surface facilitating standing or walking on the fishing pole organizer. The upwardly directed channels may be tapered to snugly receive a fishing pole and optimize the space occupied by the fishing pole organizer on a boat deck or other location.

15 Claims, 12 Drawing Sheets

(56) References Cited

U.S. PATENT DOCUMENTS

| | | | | |
|---|---|---|---|---|
| 4,133,158 A * | 1/1979 | Ting | ............................ | E04H 9/14 |
| | | | | 52/478 |
| 4,170,801 A * | 10/1979 | Ward | ...................... | A01K 97/08 |
| | | | | 206/315.11 |
| D256,621 S * | 8/1980 | Dillon | ........................... | D25/123 |
| 4,414,257 A * | 11/1983 | Haraga | ...................... | B32B 3/28 |
| | | | | 428/182 |
| D276,110 S * | 10/1984 | Savelkouls | .................. | D6/675.1 |
| D279,583 S * | 7/1985 | Hall | .............................. | D19/83 |
| 4,582,203 A * | 4/1986 | Davis | ...................... | A01K 97/10 |
| | | | | 211/70.8 |
| 4,631,891 A * | 12/1986 | Donavich | ........... | B62D 25/2054 |
| | | | | 296/204 |
| 4,733,898 A | 3/1988 | Williams | | |
| 4,779,914 A * | 10/1988 | Friedline | ................ | A01K 97/10 |
| | | | | 211/198 |
| 4,794,876 A * | 1/1989 | Levine | ...................... | B63B 7/04 |
| | | | | 224/406 |
| 4,807,381 A * | 2/1989 | Southard | .............. | A47B 81/005 |
| | | | | 211/64 |
| 4,873,777 A * | 10/1989 | Southard | .............. | A47B 81/005 |
| | | | | 211/64 |
| 4,892,052 A | 1/1990 | Zook et al. | | |
| 4,947,595 A | 8/1990 | Douds et al. | | |
| 4,951,992 A * | 8/1990 | Hockney | ............ | B62D 25/2054 |
| | | | | D25/138 |
| D310,302 S * | 9/1990 | Southard | ........................ | 211/163 |
| 4,961,505 A * | 10/1990 | Moeller | ................ | A47F 7/0035 |
| | | | | 211/69.8 |
| 5,005,509 A * | 4/1991 | Williams | ................ | B63B 17/00 |
| | | | | 224/406 |
| 5,058,302 A * | 10/1991 | Minneman | .............. | F41A 23/18 |
| | | | | 206/315.11 |
| 5,152,494 A * | 10/1992 | Frunzar | ................. | A01K 97/08 |
| | | | | 248/513 |
| D332,187 S * | 1/1993 | Stravitz | ........................... | D6/407 |
| 5,228,252 A | 7/1993 | Nehls | | |
| 5,257,700 A * | 11/1993 | Wallace | .............. | A47B 81/005 |
| | | | | 211/106 |
| 5,351,458 A | 10/1994 | Lehe | | |
| 5,487,475 A * | 1/1996 | Knee | .................... | A47B 81/005 |
| | | | | D6/552 |
| D377,425 S * | 1/1997 | Stravitz | ........................... | D6/407 |
| 5,735,097 A * | 4/1998 | Cheyne | ................... | E04B 5/026 |
| | | | | 52/489.1 |
| 5,833,386 A | 11/1998 | Rosan et al. | | |
| D402,137 S * | 12/1998 | Blazevich | ................... | D6/682.4 |
| 5,881,508 A * | 3/1999 | Irvine | ...................... | E04F 15/10 |
| | | | | 52/579 |
| 5,943,976 A * | 8/1999 | Bakker | ................... | A47C 7/024 |
| | | | | 114/361 |
| 5,979,102 A * | 11/1999 | Sagryn | ................... | A01K 97/08 |
| | | | | 114/364 |
| 6,065,264 A | 5/2000 | Imler et al. | | |
| 6,077,007 A | 6/2000 | Porter et al. | | |
| 6,134,854 A | 10/2000 | Stanchfield | | |
| D433,251 S * | 11/2000 | Blazevich | ...................... | D6/629 |
| 6,186,087 B1 * | 2/2001 | Vinas | ...................... | B63B 25/28 |
| | | | | 114/343 |
| 6,283,527 B1 | 9/2001 | Desmarais | | |
| 6,324,796 B1 * | 12/2001 | Heath | .................... | E04F 15/105 |
| | | | | 52/579 |
| 6,360,902 B1 | 3/2002 | Searles | | |
| 6,591,541 B1 * | 7/2003 | Cummings | ............. | A01K 97/10 |
| | | | | 248/514 |
| 6,607,084 B1 * | 8/2003 | Spinelli | ................. | A47F 7/0021 |
| | | | | 211/71.01 |
| 6,895,881 B1 | 5/2005 | Whitaker | | |
| 6,941,707 B2 * | 9/2005 | Sigmund | ............... | E04D 13/178 |
| | | | | 52/302.1 |
| D510,673 S * | 10/2005 | Prata dos Santos | ........... | D6/629 |
| 7,021,012 B2 * | 4/2006 | Zeng | ........................ | E04F 15/06 |
| | | | | 52/592.1 |
| 7,047,697 B1 * | 5/2006 | Heath | ...................... | E04F 15/10 |
| | | | | 52/592.1 |
| D533,283 S * | 12/2006 | Holztrager | ................... | D25/123 |
| 7,165,703 B1 | 1/2007 | Howe | ..................... | B63B 25/002 |
| | | | | 224/406 |
| 7,281,346 B1 * | 10/2007 | Cook | ....................... | F41A 23/02 |
| | | | | 206/315.11 |
| 7,739,965 B2 | 6/2010 | Heinrichs et al. | | |
| 7,846,524 B2 * | 12/2010 | Baglietto | ................. | A47L 23/24 |
| | | | | 428/54 |
| 8,002,126 B1 * | 8/2011 | Drum | ......................... | A45F 3/44 |
| | | | | 211/195 |
| D651,795 S * | 1/2012 | Buie, II | ......................... | D3/262 |
| 8,162,156 B1 * | 4/2012 | Crisman | ................. | G10D 13/12 |
| | | | | 211/85.6 |
| 8,505,998 B1 | 8/2013 | Weller | | |
| D704,862 S * | 5/2014 | Boccuzzi | ..................... | D25/141 |
| D738,538 S * | 9/2015 | Lillejord | ...................... | D25/138 |
| D742,032 S * | 10/2015 | Smith | ......................... | D25/48.2 |
| D772,943 S * | 11/2016 | Okamoto | ......................... | D15/5 |
| D815,931 S * | 4/2018 | Skluzak | ......................... | D8/14 |
| D852,536 S * | 7/2019 | Arnall | ......................... | D22/108 |
| 10,542,738 B2 * | 1/2020 | Moses | ................... | A47F 7/0035 |
| D887,350 S * | 6/2020 | Yamamoto | ................... | D13/108 |
| D908,927 S * | 1/2021 | Vaillant | ......................... | D25/143 |
| 2001/0054595 A1 * | 12/2001 | Cabrera | .............. | A47B 81/005 |
| | | | | 211/89.01 |
| 2005/0076590 A1 | 4/2005 | Wang et al. | | |
| 2011/0132252 A1 | 6/2011 | Kaye | | |
| 2012/0037579 A1 * | 2/2012 | Muldoon | .................. | F41A 23/18 |
| | | | | 211/64 |
| 2015/0182020 A1 * | 7/2015 | Rahman | ...................... | B60R 7/14 |
| | | | | 211/64 |
| 2018/0014642 A1 * | 1/2018 | Quinto | ................. | A47B 46/005 |
| 2018/0206633 A1 * | 7/2018 | Ryan | ................... | A47B 81/005 |
| 2018/0265013 A1 * | 9/2018 | Beznes | ................... | A01K 97/10 |
| 2019/0038829 A1 * | 2/2019 | Nasker | ................... | A61B 50/22 |

\* cited by examiner

FISHING POLE ORGANIZER

CROSS-REFERENCE TO RELATED APPLICATION

This application claims the benefit of U.S. Provisional Patent Application No. 62/826,379, filed on Mar. 29, 2019, which is incorporated by reference herein in its entirety.

FIELD OF THE INVENTION

The present invention relates to fishing accessories, and more particularly, to a fishing pole organizer including a plurality of open channels adapted for organizing and safeguarding fishing poles that are stored on boat decks.

DESCRIPTION OF THE PRIOR ART

Fishing is a recreational sport enjoyed by many throughout mountainous streams, and on lakes, ponds, and oceans. The sport has become a chosen career for some as many professional fishermen participate in sponsored events.

It is quite common for individuals to use a boat when traveling to remote fishing spots. The boat is often docked along the shore, or is transported on a trailer by vehicle. Most boats are generally equipped with fishing gear such as fishing rods, tackle, and bait, tools and equipment generally needed and used for boating. A large majority of boats typically include a planar deck comprising a fiberglass material that is often covered with marine carpeting, or rubber matt specifically adapted for use with water. In most cases, a number of fixtures are mounted on the upper surface of the boat deck, such as, stationary or swivel seats to accommodate seating, storage bins for stowing a variety of articles such as life jackets, rope, tools, and other objects, safety equipment such as a fire extinguisher, and a console including controls, and steering for operating the boat. The installed layout of such fixtures typically reduces the amount of space available on a boat deck for individuals to maneuver and walk around. Some boats include elongate openings formed along the inner sidewalls of the boat to provide additional space for storing objects to help reduce clutter on the boat deck. Storage provided on most boats is not designed to adequately store fishing poles or rods in an organized, easily accessible manner.

It is common when fishing, or when done fishing and preparing to leave at the end of the day, for users to rest one or more fishing poles on, or against the seat of the boat, or place fishing poles loosely on the boat deck. This practice proves daunting in situations where the boat deck has limited space to walk on as a result of the layout of fixtures, boating equipment, and fishing poles laying around on deck. Maneuvering or negotiating one's footing in stepping over fishing poles that are placed on or about the seats, or on the boat deck, increases the risk of individuals falling and sustaining injuries, not to mention the possible damage caused to the fishing pole. To prevent this from happening, individuals often store fishing poles or rods in designated rod holders located at the stern of the boat, or in various storage bins or elongate openings provided on or within the inner sidewalls of the boat. In doing so, the fishing poles are often bunched together in an unorganized bundle making it difficult for users to distinguish between fishing rods when retrieving or interchanging fishing poles during use, and often resulting in tangled fishing poles.

Various methods and devices have been employed to store fishing poles or rods in a more organized manner. Some prior art devices include rigid or soft, portable cases or elongate tubes having a closure for securely housing one or more fishing poles therein. Such cases or tubes typically have a carrying handle, and are designed to accommodate fishing poles that can be dissembled where a top portion of the pole disconnects from a bottom portion of the pole, or for fishing poles having a telescoping pole. Other fishing pole holders include racks, generally constructed from wood or plastic, and designed to store fishing poles in a vertical or horizontal position. For example, some racks include frame members extending from a support base, where a horizontal plank is attached to side frame members and situated a distance apart from a bottom plank that is also attached to side frame members. Typically, the top plank includes a plurality of holes or holding clamps or clips, that each correspond to a shallow recess formed within the top surface of the bottom plank. The tips of the fishing pole are inserted within the top hole, or the shaft of the pole is inserted within a designated clamp, and the bottom part of the fishing pole handle is laid to rest within the shallow recess of the bottom plank storing the fishing pole in a vertical, upright position. Still other storage racks include two vertical members, spaced apart at a distance from each other, and including a hooks disposed in sequential order along a vertical axis on each vertical member for storing fishing rods in the hooks in a horizontal position similar to that of a gun rack. Other devices include fishing pole holders that are, permanently or temporarily, attached to the peripheral edge, stern or bow of the boat, where such holders include a tube for removably inserting the handle of the rod within the tube, or a Y-shaped holder aligned with an open ring, in which the handle of a fishing pole is inserted within the open ring while the shaft of the pole is laid to rest in the Y-shaped holder. Some individuals strain to construct fishing rod holders that are fabricated from metal and mounted to a boat deck using robust nuts and bolts, or by welding.

The use of conventional fishing racks or holders provides a limited solution for wanting to safeguard fishing poles in an organized manner on a boat deck. For example, using fishing pole racks on the deck of a boat requires more deck space thus compromising the ability of a person to maneuver comfortably on the boat deck. Also, mounting a plurality of fishing pole holders along the perimeter of the boat may prove cumbersome, costly, and is not very practical when hauling a boat over land for long distances. Storing a plurality of fishing poles together in a storage bin on the boat often results in fishing lines tangling with each other, reel handles that catch on one another, tips of fishing poles, or guide line rings of fishing poles hooking on to each other requiring individuals to untangle fishing lines, or release engagement of the reel handles, tips or guide line rings of the fishing poles. Further, permanently welding, or attaching fishing pole holders with nuts and bolts, onto the deck boat reduces boat deck space, and requires individuals to keep an eye out at all times when maneuvering on the boat deck to prevent hitting or running into the fishing poles.

Accordingly, there exists a need to solve some of the aforementioned problems mentioned herein. For example, there remains a need for fishing pole storage solutions which save up space, or efficiently use available space. There also remains a need for fishing pole storage solutions that are capable of storing fishing poles in a manner that is safe to the fishing poles and the surrounding persons.

SUMMARY OF THE INVENTION

The present invention provides a space-saving, cost-effective and easy-to-use fishing pole organizer for storing and organizing one or more fishing poles on a boat deck in a manner that is safe for the fishing poles, surrounding person(s) and the boat. The fishing pole organizer may be conveniently customized to adjust to different boat deck sizes corresponding to different boat models. The fishing pole organizer is further configured to allow a person to stably stand and walk thereon.

In a first implementation of the invention, a fishing pole organizer for storing and organizing one or more fishing poles on a boat deck comprises a plurality of elongated channel members. The channel members are arranged in side-by-side and spaced-apart relationship with one another defining a plurality of upwardly directed channels. Each upwardly directed channel is formed between adjacent channel members and is configured to receive a fishing pole therein.

In a second aspect, the plurality of elongated channel members arranged in side-by-side and spaced-apart relationship with one another may have a trapezoidal shaped when observed in top plan view.

In another aspect, the upwardly directed channels may be tapered from a proximal end of the fishing pole organizer to a distal end of the fishing pole organizer when observed in top plan view.

In another aspect, each channel member may include a planar top surface extending along the length of the channel member. The planar top surfaces of the plurality of channel members arranged in side-by-side and spaced-apart relationship may be configured to allow standing and walking thereon.

In another aspect, the channel members may include a respective flange extending into an upwardly directed channel of the plurality of upwardly directed channel. The flange may be configured to partially close the upwardly directed channel and retain a fishing pole within the upwardly directed channel.

In another aspect, the channel members may be formed as separate bodies and may be selectively repositionable relative to one another to vary a width or shape of each upwardly directed channel.

In another aspect, the channel members may be interconnected to one another.

In another aspect, the plurality of channel members may be carried by a base plate. The base plate may be attached to a bottom of the plurality of base members and interconnect the plurality of base members.

In another aspect, the base plate may be separable to remove at least one channel member and thereby downsize the fishing pole organizer.

In another aspect, the base plate may be cuttable.

In another aspect, the plurality of channel members and the base plate may be integrally-formed into a single-piece unit.

In another aspect, the fishing pole organizer may further include at least one transverse channel extending across the plurality of channel members, from a top of the plurality of channel members to the base plate.

In another aspect, the at least one transverse channel may include two or more transverse channels arranged at different longitudinal positions along the fishing pole organizer.

In another aspect, the fishing pole organizer may further include a plurality of proximal blocks arranged facing, and spaced apart from, a proximal end of the plurality of elongated channel members. The proximal blocks may define a plurality of spaces, wherein each space may be formed between adjacent proximal blocks. Further, each space may face a corresponding upwardly directed channel, and may be configured to receive a proximal end of a handle section of a fishing pole in turn received within the corresponding upwardly directed channel.

In another aspect, the upwardly directed channels may be tapered when observed in top plan view, with a proximal end of the upwardly directed channels being wider than a distal end of the upwardly directed channels. Furthermore, each space may be wider than the proximal end of the corresponding upwardly directed channel.

In another aspect, the plurality of proximal blocks may be carried by a first base plate. The first base plate may be attached to a bottom of the plurality of proximal blocks and interconnect the plurality of proximal blocks.

In another aspect, the plurality of channel members may be carried by a second base plate. The second base plate may be attached to a bottom of the plurality of base members and interconnect the plurality of base members. The second base plate may be connected to the first base plate by a base plate section.

In another aspect, the base plate section may include at least one tear section configured to facilitate tearing the base plate to detach the plurality of channel members from the plurality of proximal blocks.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "back", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a fishing pole organizer comprising a plurality of channel members arranged in spaced apart relation and including upwardly open channels adapted for storing one or more fishing rods therein in an organized manner.

Figure 1:
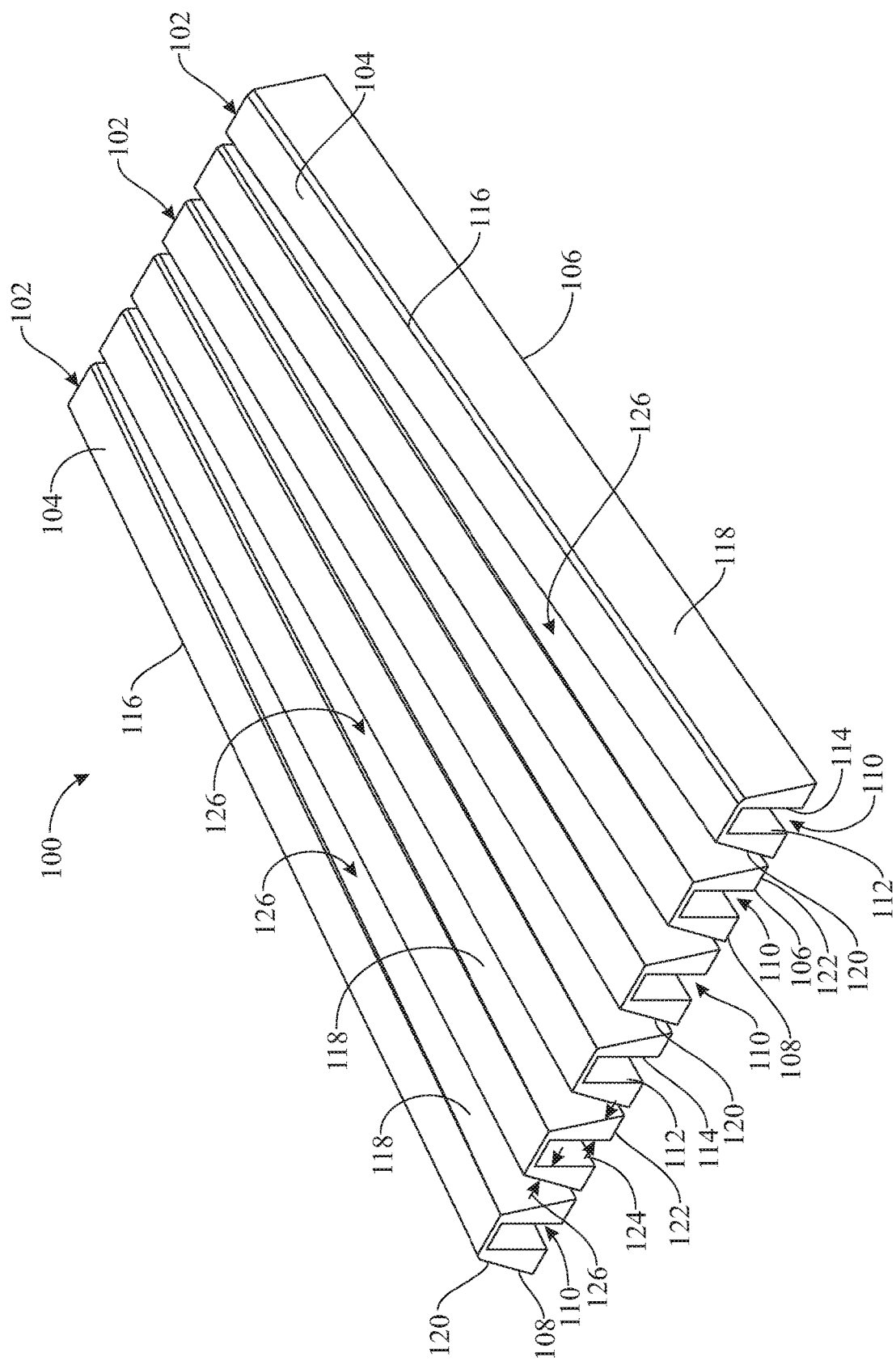
FIG. 1 presents an isometric view of a fishing pole organizer in accordance with a first illustrative embodiment of the present invention, the view showing a plurality of channel members arranged in spaced apart relation and including downwardly open channels alternating transversely with upwardly open channels adapted for storing one or more fishing rods therein.
Figure 2:
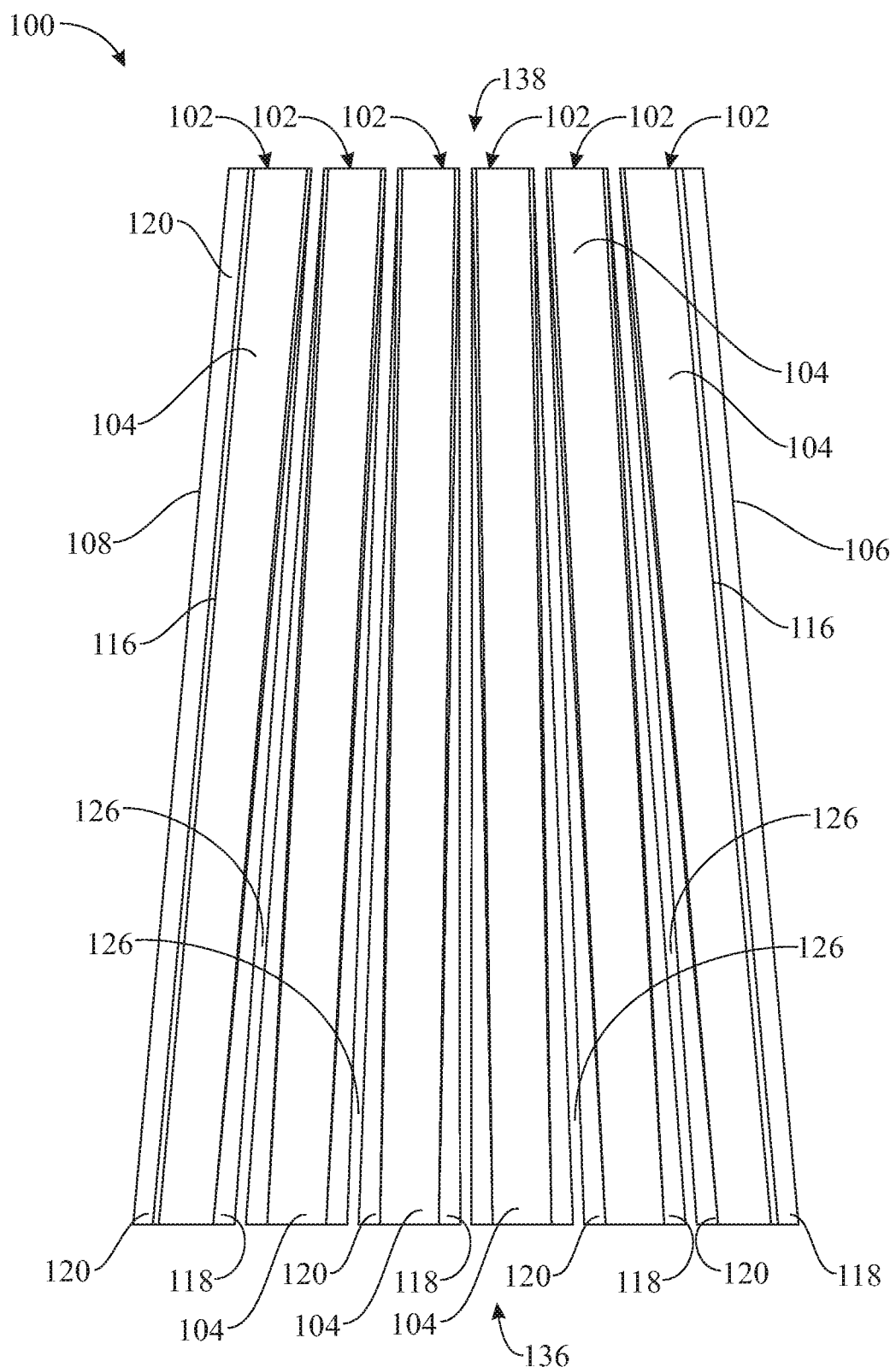
FIG. 2 presents a top plan view of the fishing pole organizer of FIG. 1, showing a top load surface, and two sidewalls of each channel member, and upwardly open channels used store fishing poles therein.

Referring initially to FIGS. 1 and 2, an isometric view and a top plan view are shown, respectively, of a fishing pole organizer 100 adapted for storing and organizing fishing poles on boat decks in accordance with one embodiment of the present invention. The fishing pole organizer 100 includes a plurality of channel members 102 formed as elongate bodies, which are arranged in side-by-side, generally parallel, spaced-apart relationship with one another; for instance, in the non-limiting example shown in the drawings, the plurality of channel members 102 consists of six channel members 102. The channel members 102 can be installed or set on a boat deck or other surface, and are configured as a walk-on matt. Each channel member 102 includes a planar load surface 104 at a top of the channel member 102 (i.e. a planar top surface, as shown, which is configured to rest a load thereon. Each channel member 102 further includes sidewalls 106, 108 extending downwards from opposite longitudinal edges 116 of the top, planar load surface 104 forming inverted or downwardly open channels 110 having an open end. Each sidewall 106, 108 includes an inner vertical surface 112, 114 opposite each other, and an outer surface 118, 120 diverging outwards from the longitudinal edges 116 of the planar load surface 104, and from the inner vertical surfaces 112, 114 defining a base 122 having a width indicated at 124. As such, each outer surface 118, 120 inclines towards the planar load surface 104 of each channel member 102, defining a top width indicated at 125 that is smaller when compared to base width 124. The base width 124 of each base 122 is selectively engineered to enhance the structural integrity of the arranged plurality of channel members 102 and withstand a greater amount of weight disposed on the planar load surfaces 104. A base 122 having a wider footing helps to transfer or distribute weight of a load placed on the planar load surfaces 104 and accommodate individuals of different weights when walking or standing on the organizer 100. Conversely, the top width 125 allows the sidewalls 106, 108 to flex a certain degree to help absorb the weight of the person and provide for a comfortable matt for use on boat decks.

The side-by-side relative arrangement of the channel members 102 provides that an outer surface 118 of one sidewall 106 oppositely faces an outer surface 120 of another sidewall 108 defining a plurality of upwardly open channels 126 that alternate transversely with the downwardly open channels 110. Each upwardly open channel 126 is adapted for storing a fishing pole therein, and comprises a general, V-shape configuration that is defined by the inclined slope of the outer surfaces 118 and 120 of sidewalls 106 and 108, respectively. As such, the open width of each upwardly open channel 126 is determined by the side-by-side separation between adjacent channel members 102, and the geometrical formation of the outer surfaces 118, 120 of each sidewall 106 and 108. For example, sidewalls 106, 108 having a vertical outer surface 118, 120 may result in a plurality of upwardly open channels 126 having wider bottoms or narrower openings compared to the embodiment depicted herein. As such, it will be appreciated that each channel member 102 may comprise a variety of different heights, widths, and lengths defined by the dimensional characteristics of the sidewalls 106, 108, the widths 124, 125, and the planar load surfaces 102. The fishing pole organizer 100 may be employed for use as a walk-on matt on boat decks, and to help reduce clutter on boat decks, and safeguard fishing poles by storing one or more fishing poles on the boat in an organized manner. The size of the fishing pole organizer 100 is easily customized to accommodate boats having different deck sizes. The width of the fishing pole organizer 100 is adjustable by increasing or decreasing the amount of channel members 120 used. The storage space of each upwardly open channel 126 is also customized by selecting different separations between the channel members 102 to accommodate fishing poles having larger diameter shafts, or different eyelet sizes.

In one embodiment, each channel member 102 is constructed from a high density polyurethane, closed cell, or fiber-reinforced foam to provide resilient comfort when standing or walking on the top load surface 102 of each channel member 102. In alternative embodiments, each channel 102 may comprise any of a dense rubber material, metal such as aluminum, stainless steel, or galvanized aluminum, fiberglass, wood, ceramic, layered batting of fabric material, or nylon (polyamide). Nylon has high impact resistance, high resistance to deterioration, high heat distortion temperature when exposed to sun rays, and is also resistant to a wide array of chemicals including, alkalies, dilute acids, and oxidizing agents. The relatively light weight of nylon eases transport and handling of channel members 102. Each channel member 102 may also be fabricated using well-known mold injection processes. Also, each planar top surface 104 of each channel member 102, may be coated or covered with marine carpeting, a rubber or dense foam material, or friction enhancing features such as raised ridges, pyramids, or nubs, or sand impregnated coatings, to prevent individuals from slipping when standing or walking on the fishing pole organizer 100.

In one embodiment, such as the present embodiment, the channel members 102 are formed as separate individual pieces and are disposed, in a side-by-side, spaced apart relationship on the deck of boat. However, in one alternative embodiment, the fishing pole organizer 100 includes mechanical connectors or fasteners such as cross-braces, webs or webbing, clips, brackets, clamps, or could be cast/injection molded in one piece or other suitable mechanical connectors provided anywhere along the longitudinal lower edge of opposite sidewalls 106, 108 to securely attach a plurality of channel members 102 together as one single unit. The fishing pole organizer 100 could be integrated into the deck in the building process of a new boat. In one example, each channel member 102 may include a connector that is integrally formed on or with the outer surface 118 of a channel member 102, and a connector receiver that is integrally formed on or with the outer surface 116 of the channel member 102 where a plurality of channel members 102 where the connector provided on the outer surface 118, attaches to, or is inserted within, the connector receiver provided on the outer surface 116 thus, allowing users to easily couple any number of channel members 102 together in side-by-side relationship, as a single unit, to provide a fishing pole organizer 100 having a predetermined width tailored to accommodate boat decks of different sizes. In some embodiments, the channel members 102 and connectors may all be integrally-formed into a single-piece unit, such as made of plastic, high density polyurethane, closed cell, fiber-reinforced foam, or combinations thereof. For instance, the fishing pole organizer 100 may be routered or milled out of a solid sheet or block of material.

Figure 3:
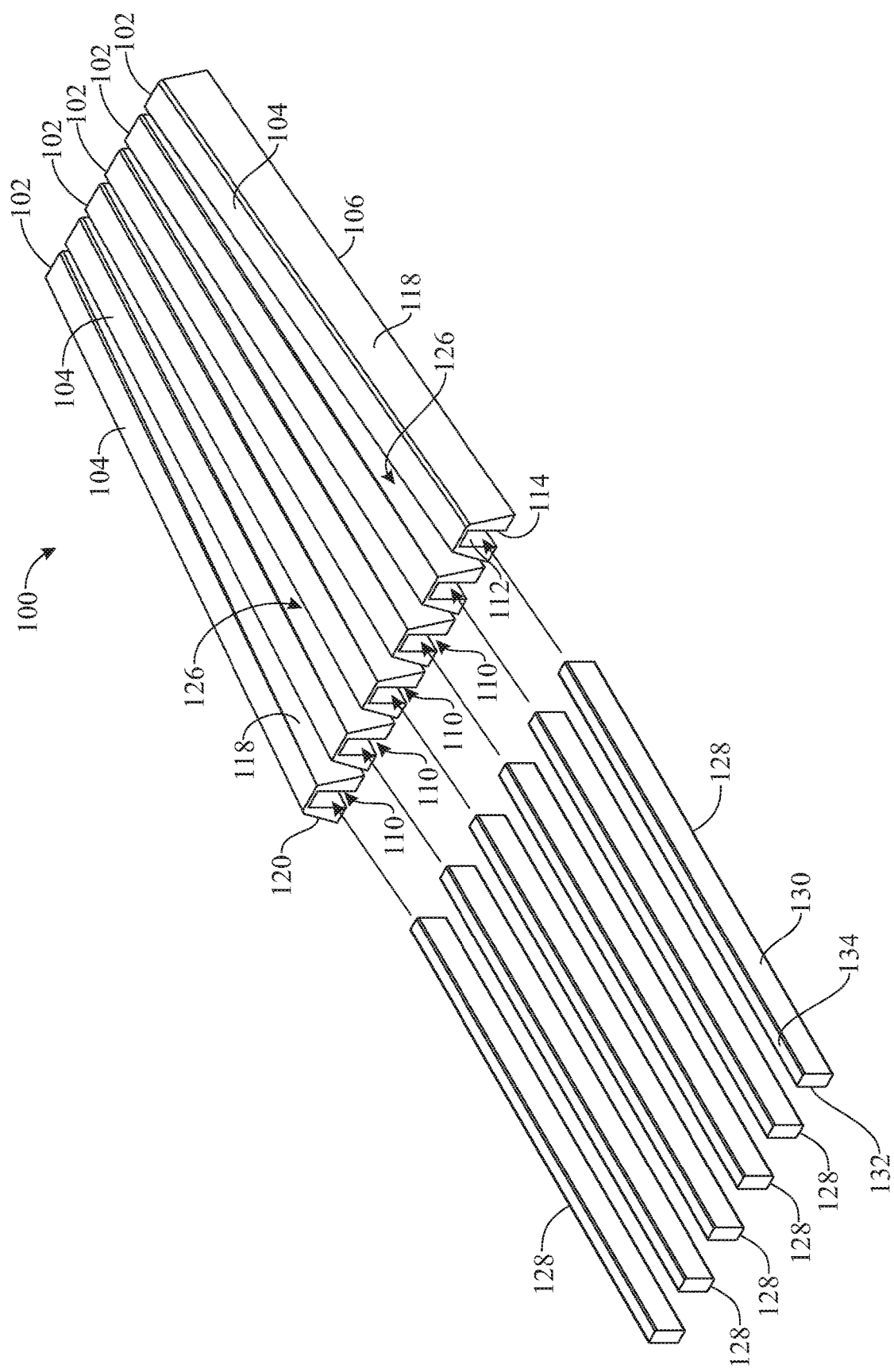
FIG. 3 presents an exploded, isometric view of the fishing pole organizer of FIG. 1, showing a plurality of load stiffeners removably insertable within each downwardly open channel to enhance the load bearing capacity of the plurality of channel members.

Turning now to FIG. 3, there is shown an exploded, isometric view, of the fishing pole organizer 100 of FIG. 1, showing a plurality of load stiffeners 128 removably inserted within each downwardly open channel 110 to enhance the load bearing capacity of the plurality of channel members 102, in accordance with an embodiment of the present invention. When the weight of a load is applied on the planar surfaces 104 of the channel members 102, the sidewalls 106, 108 flex to some degree of flexibility as provided by the width 125 (shown in FIG. 1), providing a resilient footing for a person standing or walking on the organizer 100. There may be occasions for strengthening the load bearing support of the channel members 102 especially in situations where the load bearing surfaces 104 will incur heavier loads. For example, individuals may wish to temporarily store a weighted barrel, or bin onto the organizer 100, or some other heavy object, onto the planar top surfaces 104 of the members 102. To accommodate for larger surface weights, a plurality of load stiffeners 128 are inserted within downwardly open channels 110. Each stiffener 128 is geometrically dimensioned to fit within the downwardly open channels 110 such that the vertical sidewalls 130, 132 and planar top 134 of each stiffener 128 engage the inner vertical surfaces 112, 114 and inner planar top of each downwardly open channel 110. Thus the height of each vertical sidewall 130, 132 correlates to the height of each inner wall 112, 114 of each downwardly open channel 110. The stiffeners 128 may be permanently, or removably, retained within each corresponding downwardly open channel 110. Individuals may wish to use any well-known marine lubricant to facilitate inserting and removing of the stiffeners 128 within the downwardly open channels 110. It will be appreciated that each open channel 110 may include a closed end to prevent stiffeners 128 from sliding out the open channels 110 when a boat is moving on rough seas for example. Each stiffener 128 may comprise any of wood, a dense plastic, hard rubber, resin, nylon, or any metal. In one embodiment, each stiffener 128 comprises a solid or hollow, aluminum body that is lightweight, and easily handled and transportable. It is appreciated that the geometrical shape of each stiffener 128 corresponds to the geometrical shape of each downwardly open channel 110, and thus, open channels 110 having a round, oval, or trapezoid shape will necessitate stiffeners 128 to comprise similar geometric shapes. In one embodiment, the stiffeners 128 may each include a short pull rope, ring, loop, or handle coupled to a proximate end of each stiffener 128 to assist users in pulling and removing the stiffeners 128 from the downwardly open channels 110.

Figure 4:
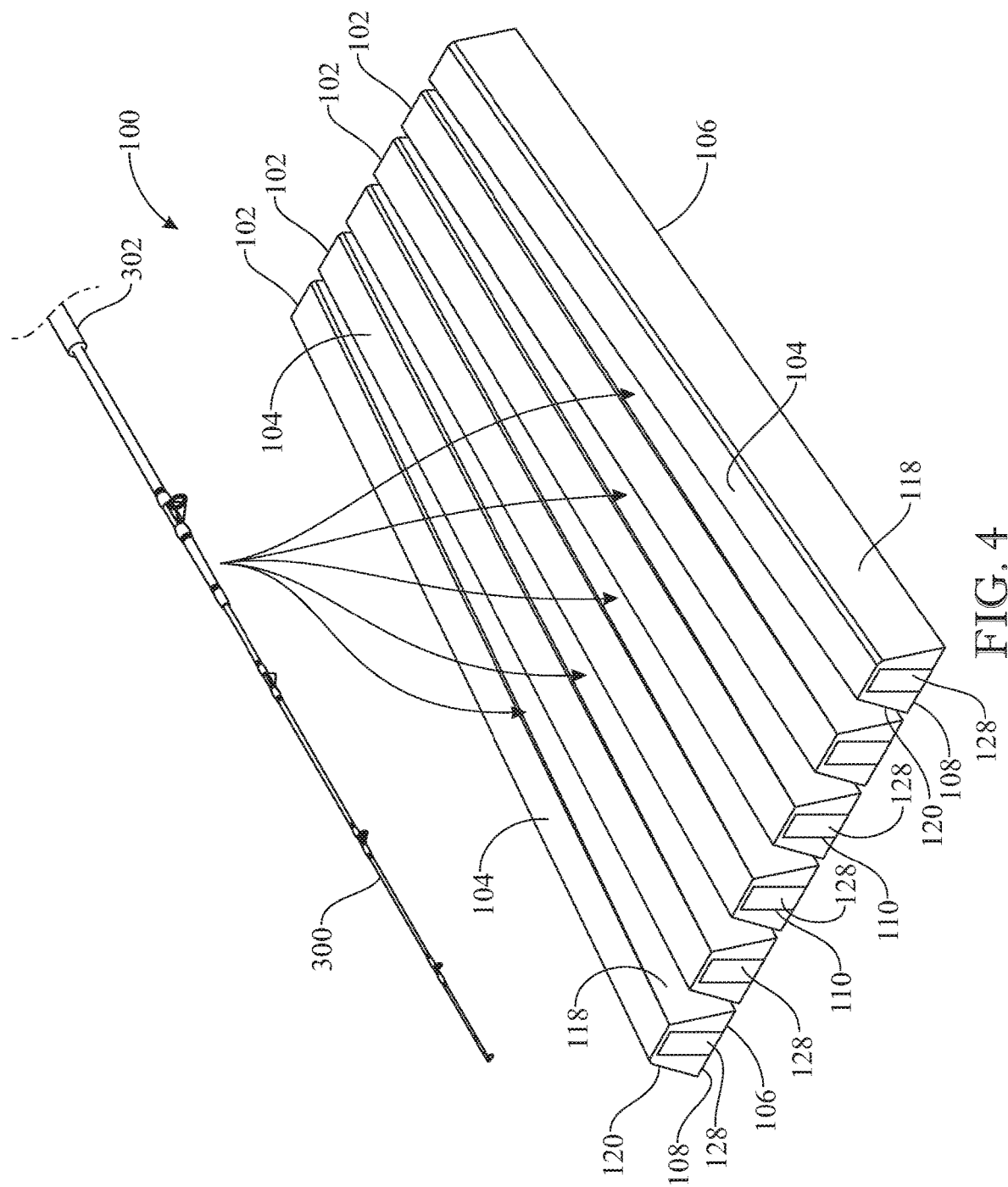
FIG. 4 presents an isometric view of the fishing pole organizer of FIG. 1, showing the plurality of load stiffeners securely inserted within each of the downwardly open channels, and one or more fishing poles removably stored within the plurality of upwardly open channels.

With reference made to FIG. 4, there is shown an isometric view of the fishing pole organizer 100 including a plurality of load stiffeners 128 securely inserted within each of the downwardly open channels 110, and showing storing one or more fishing poles 300 within the plurality of upwardly open channels 126, in accordance with the embodiment of the present invention. Rigid stiffeners 128 are retained within corresponding downwardly open channels 110 readily capable of withstanding greater weights placed on the planar surfaces 104 of the channel members 102. To reduce clutter and provide more space on boat decks, and to safeguard fishing poles 300 from being trampled on, one or more fishing poles 300 are conveniently stored within the upwardly open channels 126 in an organized manner. As shown, the length of each upwardly open channel 126 generally corresponds to the length of the fishing pole 300 to secure the shaft of the pole in place, however, there may be circumstances where it is necessary to shorten the lengths of each channel member 102 to accommodate shorter fishing poles 300, or to store only a portion of a fishing pole 300. In one embodiment, one or more upwardly open channels 126 may be wider at one end of the organizer 100 to accommodate for a larger diameter handle section 302 of the fishing pole 300. Thus, a portion of the sidewalls 118, 120 and/or planar top surfaces 104 of adjoining channel members 102 may include a cut-out, groove, or be deformed, to provide storage space for accommodating the larger size handle 302, of the fishing pole 300, within the upwardly open channels 126. In one embodiment, one or more grooves may be formed within each upwardly open channel 126, along designated areas, to receive a portion of a fishing pole line guide ring to prevent one or more fishing poles 300 from sliding within the open channels 126. Alternatively, a friction material may be disposed on, or coated over, the outer surfaces 118, 120 to prevent one or more fishing poles 300 from sliding in the channels 126.

Figure 5:
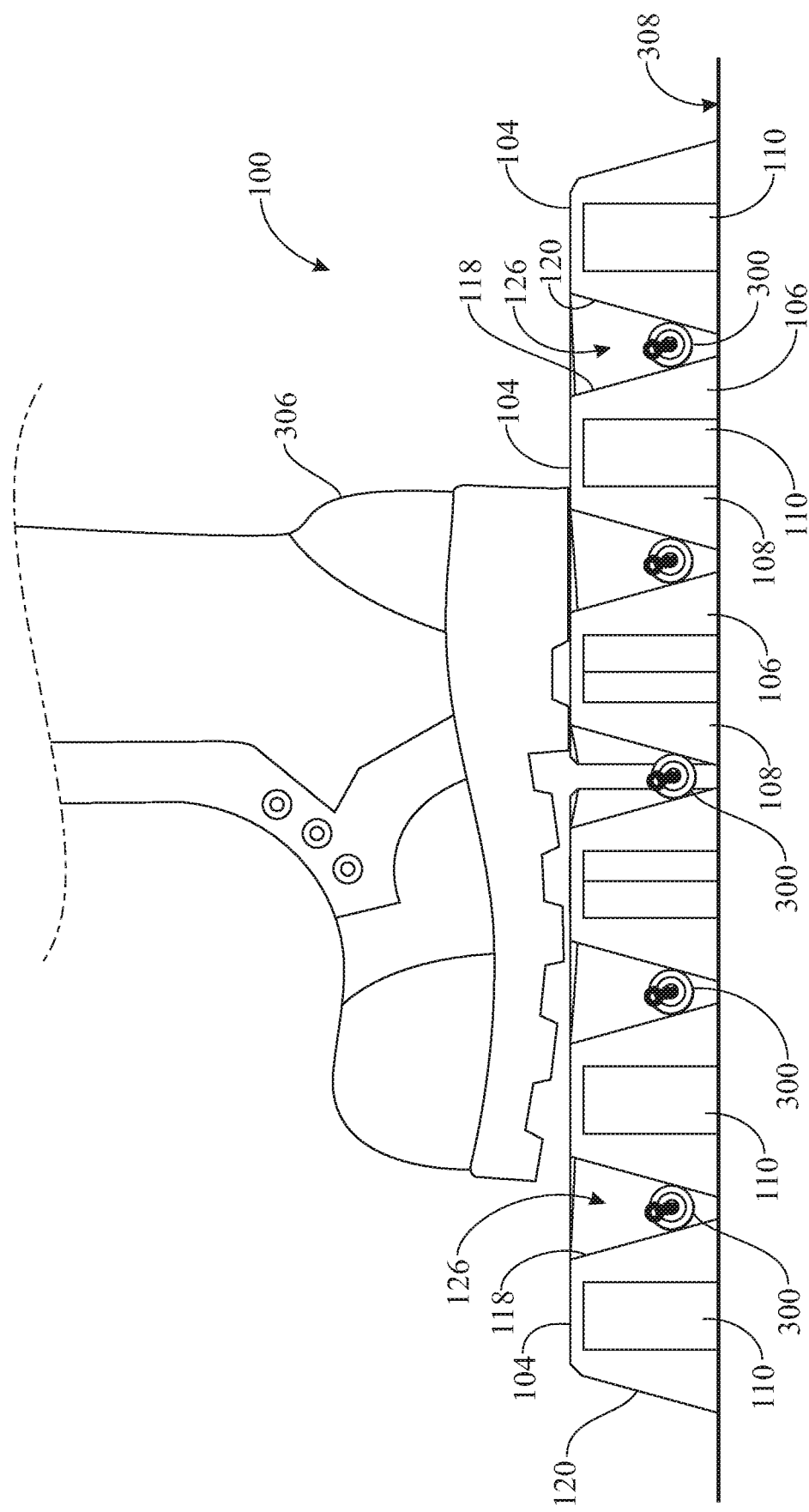
FIG. 5 presents a side elevation view of the fishing pole organizer of FIG. 1, showing a partial view of a person standing on the load bearing surface of the plurality of members for use as a matt, and a plurality of fishing rods securely stored within upwardly open channels in an organized manner.

As illustrated in FIG. 5, one or more fishing poles 300 are stored within each upwardly open channel 126 in an organized manner to safeguard fishing poles 300, and to increase space on boat decks 308. The diverging characteristic of the outer surfaces 118, 120 form generally, V-shaped channels 126 to store fishing poles 300 therein in an elevated position above the top surface of the boat deck 308. The elevated position of each fishing pole 300 allows water flowing on the surface of the boat deck 308, or dripping from the pole 300, to flow out the bottom of the channel 126. Upon storing one or more fishing poles 300 within corresponding upwardly open channels 126, individuals are free to walk and stand on the top surface of the fishing pole organizer 100 when disposed on a deck of a boat. The load bearing weight 306 of a person is evenly distributed and transferred over the planar top surfaces 104 of the channel members 102. The width 124 of each base 122, as better illustrated in FIG. 1, is selected to provide added stability and greater footing to withstand greater weight, and/or impact forces, applied on the planar surfaces 104. The load bearing surface of the fishing pole organizer 100 is further enhanced by inserting a plurality of stiffeners 128 within any number of downwardly open channels 110 to further resist downward forces or weight 305 applied on the load bearing surface of the fishing pole organizer 100.

With reference again to the top plan view of FIG. 2, in some embodiments, such as the present embodiment, the channel members 102 may be approximately, but not exactly, parallel to one another, and may form a slightly tapered arrangement in which the width of the fishing pole organizer 100 at a first end 136 thereof is greater than the width of the fishing pole organizer 100 on an opposite, second end 138 thereof. A tapered configuration of the fishing pole organizer 100 allows to better fit the fishing pole organizer 100 in certain areas of a boat deck which may be non-rectangular (e.g. a side of the boat deck). The tapered configuration may be achieved by placing identical channel members adjacent one another in a tapered arrangement, i.e. such that the distance between adjacent channel members is greater at the first end 136 than at the second end 138; alternatively or additionally, as with the present embodiment, the channel members 102 may be non-identical and may present a trapezoidal footprint (i.e. shape in top plan view) and optionally skewed shape, which contribute to achieve the tapered shape or footprint of the fishing pole organizer 100 when arranging the channel members 102 in side-by-side relationship.

In some embodiments, as shown for instance in the present embodiment, the upwardly open channels 126 defined between the channel members 102 may be slightly tapered in shape such that each upwardly open channel 126 has a decreasing width from on one end thereof (for example, the end at the bottom of the figure) to the opposite end thereof (for example, the end at the top of the figure). Such a tapered shape of the upwardly open channels 126 allows each channel to more snugly receive a conventional fishing pole, which is narrower at the distal end and wider at the proximal end (where the reel and handle are located).

Figure 6:
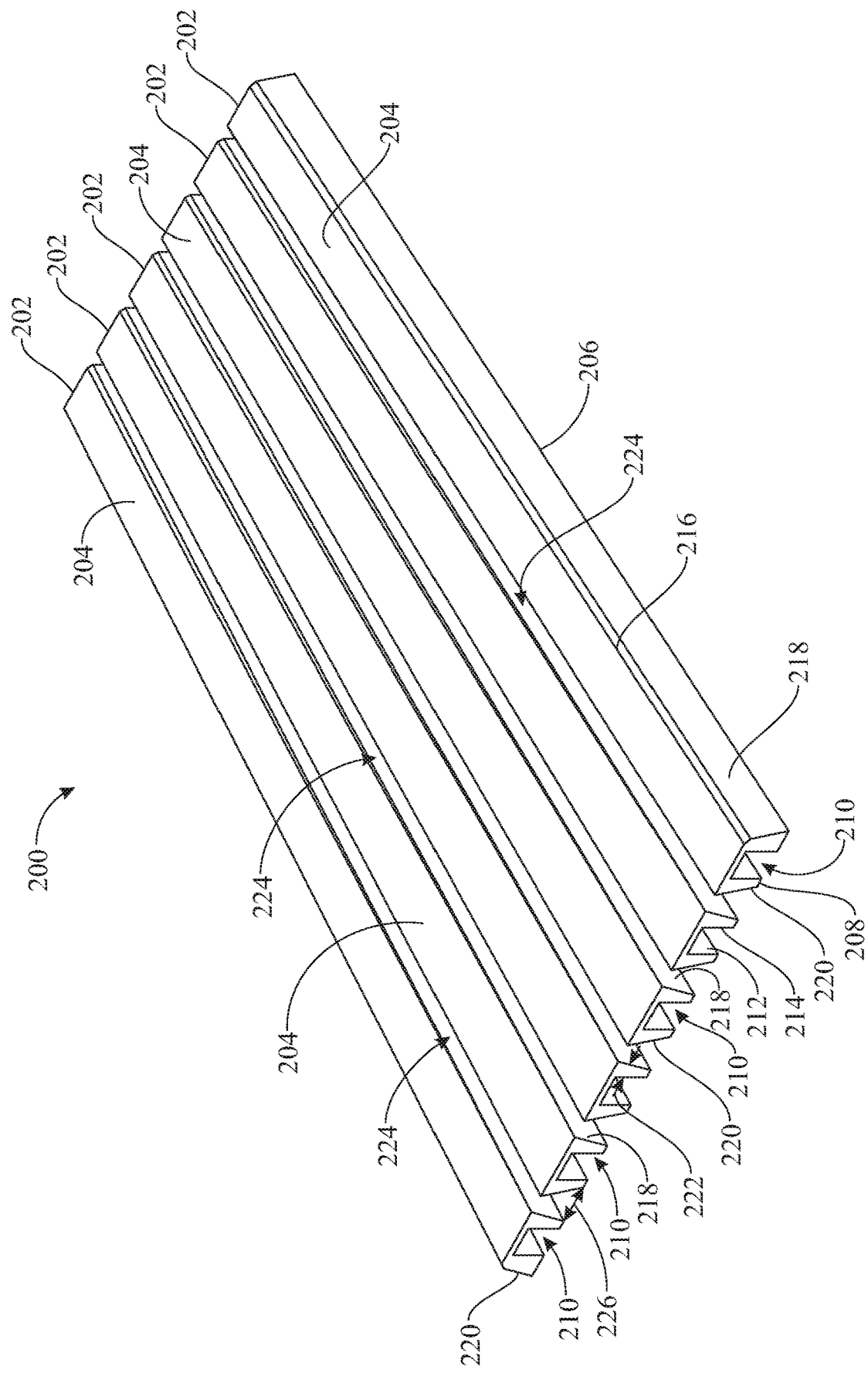
FIG. 6 presents an isometric view of a fishing pole organizer in accordance with a second illustrative embodiment of the present invention, comprising a plurality of channel members arranged in spaced-apart, side-by-side relationship including a wider top load surface, and downwardly open channels alternating transversely with upwardly open channels adapted for storing one or more fishing rods therein.

Referring now to FIG. 6, there is shown an isometric view of a fishing pole organizer 200 for storing fishing poles 300 on a boat deck in an organized manner and to increase space on the deck, in accordance with an alternative embodiment of the present invention. The fishing pole organizer 200 is similar in function to the fishing pole organizer 100 of FIG. 1, with the exception of a plurality of channel members 202 having different constructional configurations. The fishing pole organizer 200 includes a plurality of channel members 202 arranged in side-by-side, spaced apart relationship with one another. Each channel member 202 includes a top, planar load bearing surface 204, and sidewalls 206, 208 extending downwards from opposite longitudinal edges 216 of the planar load surface 204 forming inverted or downwardly open channels 210 each having at least one open end. Each sidewall 206, 208 includes an inner vertical surface 212, 214 facing opposite each other, to accommodate stiffeners 128 each having corresponding geometrical configurations, as shown in FIG. 3. Each sidewall 206, 208 comprises an outer surface 218, 220 that converges inwards from the longitudinal edges 216 of the planar load surface 204 and towards the inner vertical surfaces 212, 214 defining a width indicated at 222. The width 222 is selectively engineered to enhance the structural integrity of the channel members 202 by resisting greater weight loads applied on the planar load surfaces 204 of each channel member 202. The width 222 further defines the degree at which each sidewall 206, 208 will flex when a weighted load, such as person, is standing on the load bearing surface of the fishing pole organizer 200. Thus, a larger width 222 will provide less flexing of sidewalls 206, 208, and a smaller width 222 will provide greater flexing of the sidewalls 206 and 208. Also each planar surface 204 comprises a wider top surface to provide a fishing pole organizer 200 having a larger load bearing surface.

The spaced-apart, side-by-side arrangement of the channel members 202 provides outer surfaces 218, 220 that oppositely face each other to define a plurality of upwardly open channels 224 that alternate transversely with downwardly open channels 210, and are used for storing one or more fishing poles 300 therein, similar in function to the fishing pole organizer 100 of FIGS. 1-5. A lower portion of each upwardly open channel 224 comprises a larger width 226 when comparted to that of the upwardly open channels 126 of the fishing pole organizer 100 of FIGS. 1-5. The larger dimensional width 226 is defined by the outer surfaces 218, 220 converging inwards at predetermined angles. As such, the width 226 of each upwardly open channel 224 is determined by the side-by-side separation of the channel members 202, and the angle of convergence of the outer surfaces 218 and 220. It will be appreciated that each channel member 202 may comprise a variety of different heights, widths, and lengths defined by the dimensional characteristics of the sidewalls 206, 208, the widths 226, and the width of each planar load surface 202. The fishing pole organizer 200 is employed for use as a walk-on matt on boat decks while reducing clutter and increasing space on the boat decks by storing one or more fishing poles 300 in an organized manner on a boat, and safeguarding the fishing poles 300 from possible damage. The fishing pole organizer 200 could be integrated into the deck in the building process of a new boat. The size of the fishing pole organizer 200 is customized to accommodate boat decks of different sizes. The overall size of the fishing pole organizer 200 is adjustable by increasing or decreasing the amount of channel members 220 that are arranged in side-by-side relationship. The channel members 202 are aligned separately in sideby-side relationship with each other, or alternatively, a predetermined amount of channel members 202 are permanently, releasably or removably attached or formed together as one single unit that is carried and transported with ease, or permanently fixed on deck, and the option of integrating the fishing pole organizer 100 into the building process of the deck on a new hull.

Figure 7:
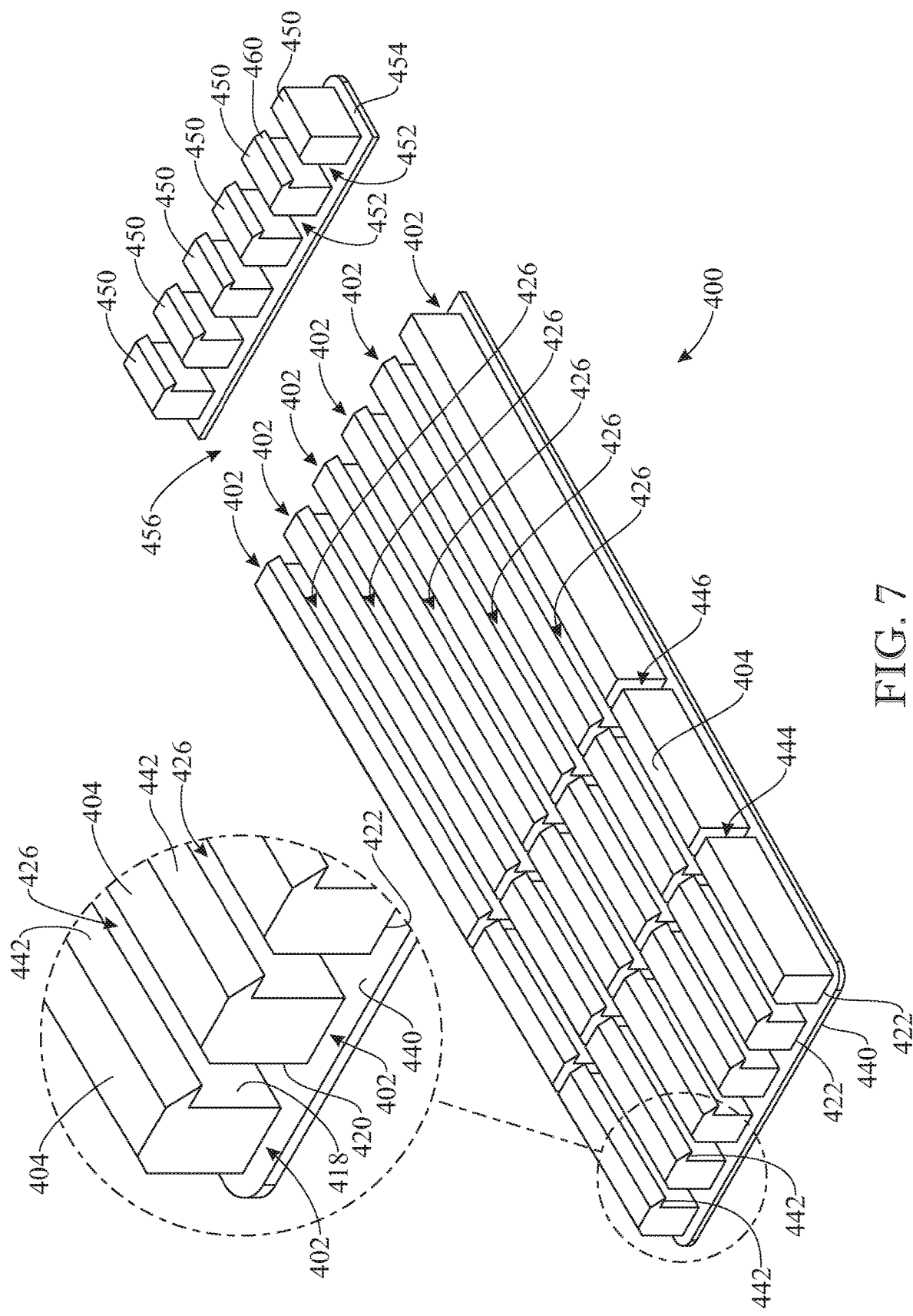
FIG. 7 presents a top isometric view of a fishing pole organizer in accordance with a third illustrative embodiment of the present invention, the fishing pole organizer comprising a plurality of channel members and a plurality of proximal blocks corresponding to the plurality of channel members.
Figure 8:
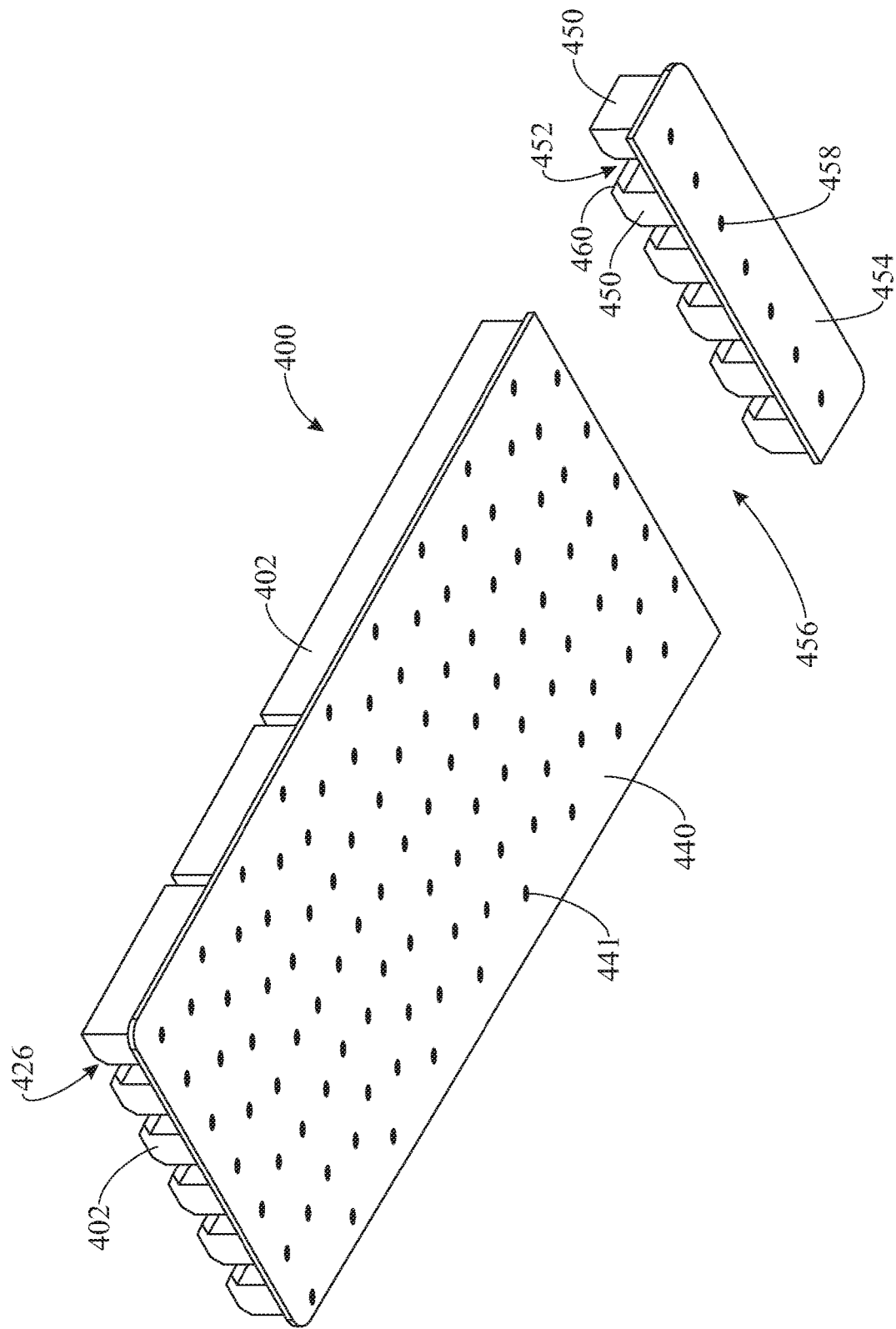
FIG. 8 presents a bottom isometric view of the fishing pole organizer of FIG. 7, showing a non-slip or adhesive material arranged on an underside of the fishing pole organizer.
Figure 9:
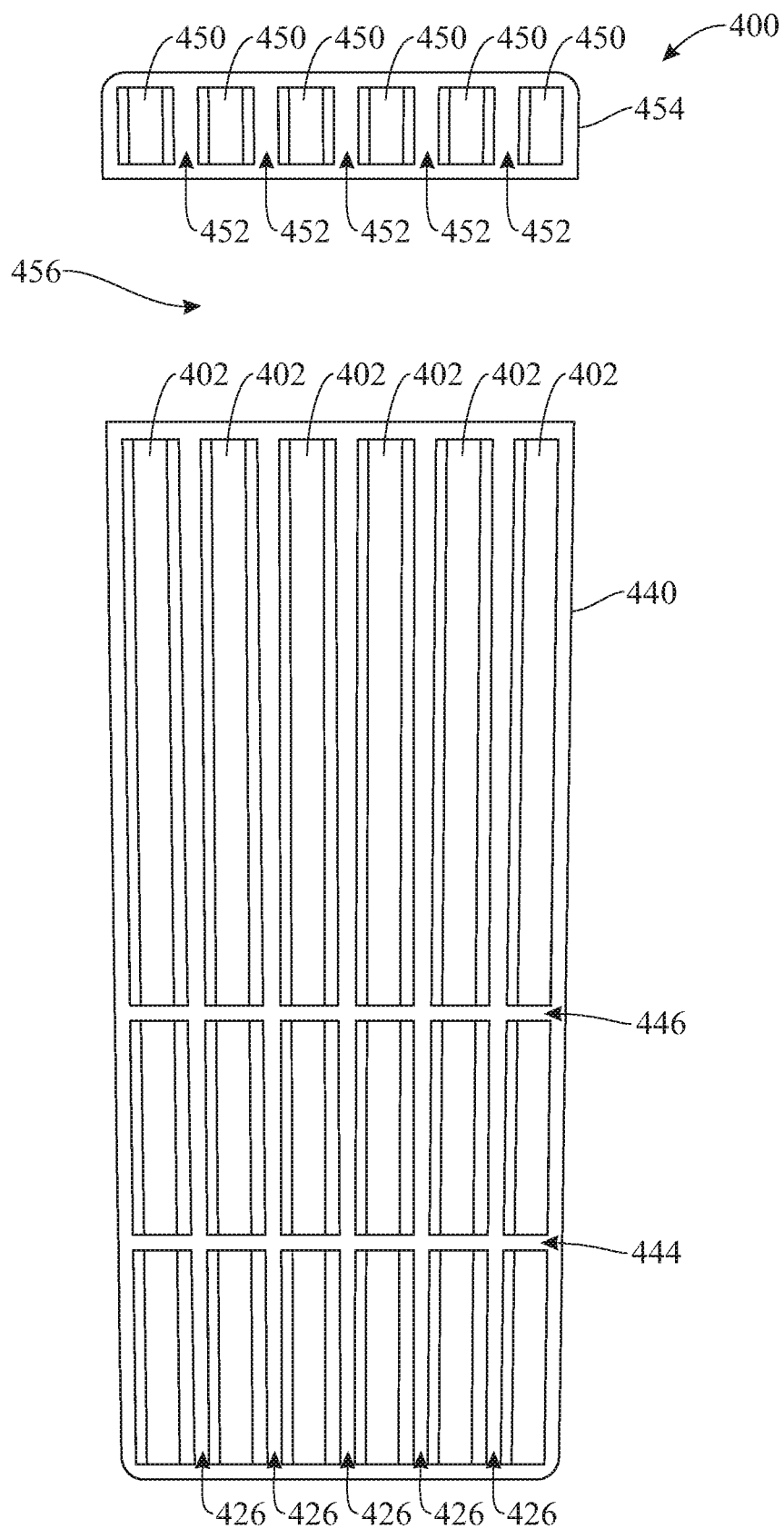
FIG. 9 presents a top plan view of the fishing pole organizer of FIG. 7, better illustrating a tapered shape of the upwardly directed channels between the channel members and the corresponding spaces between the proximal blocks.
Figure 10:
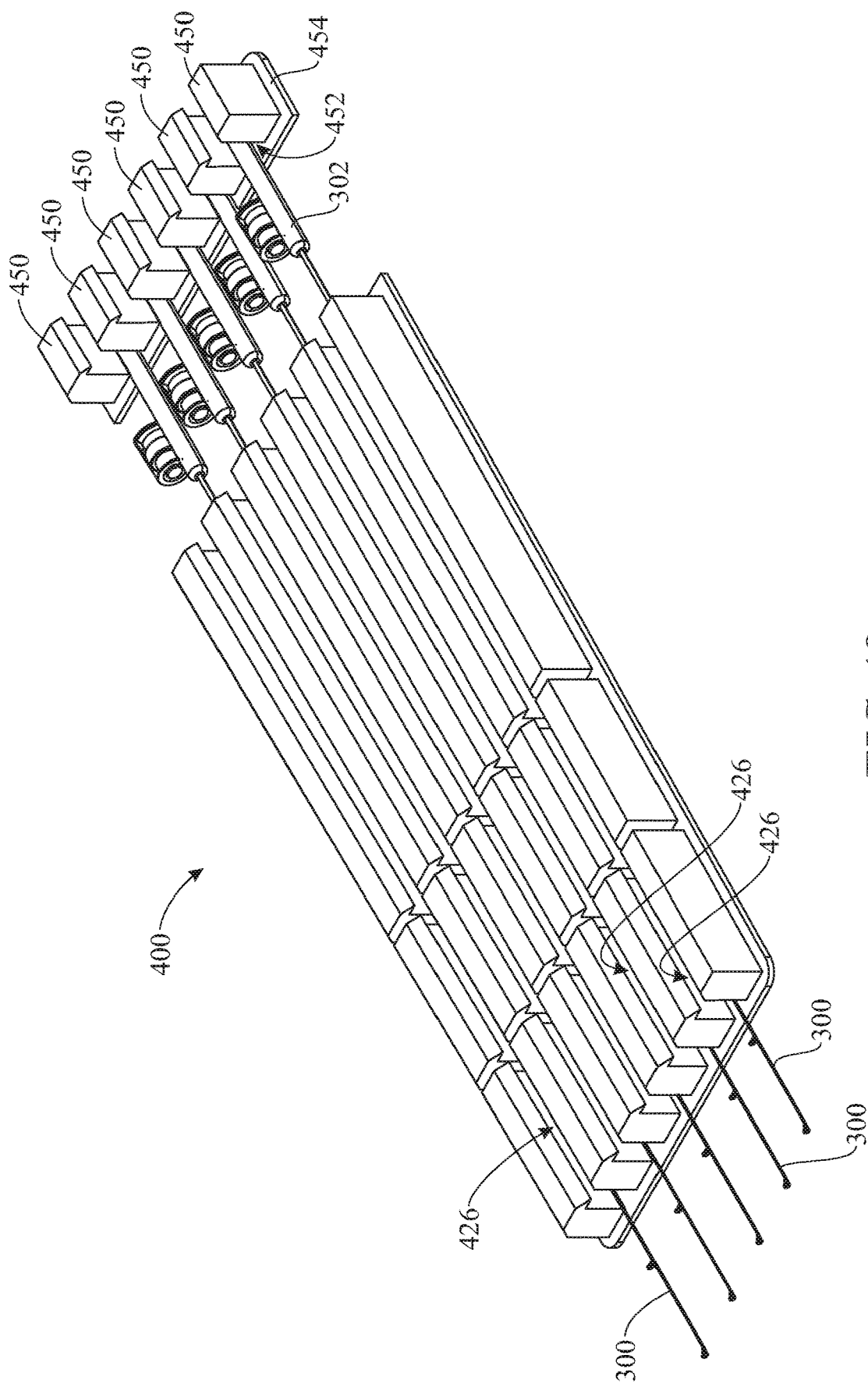
FIG. 10 presents a top distal perspective view of the fishing pole organizer of FIG. 7, showing a plurality of fishing poles stored in the fishing pole organizer.
Figure 11:
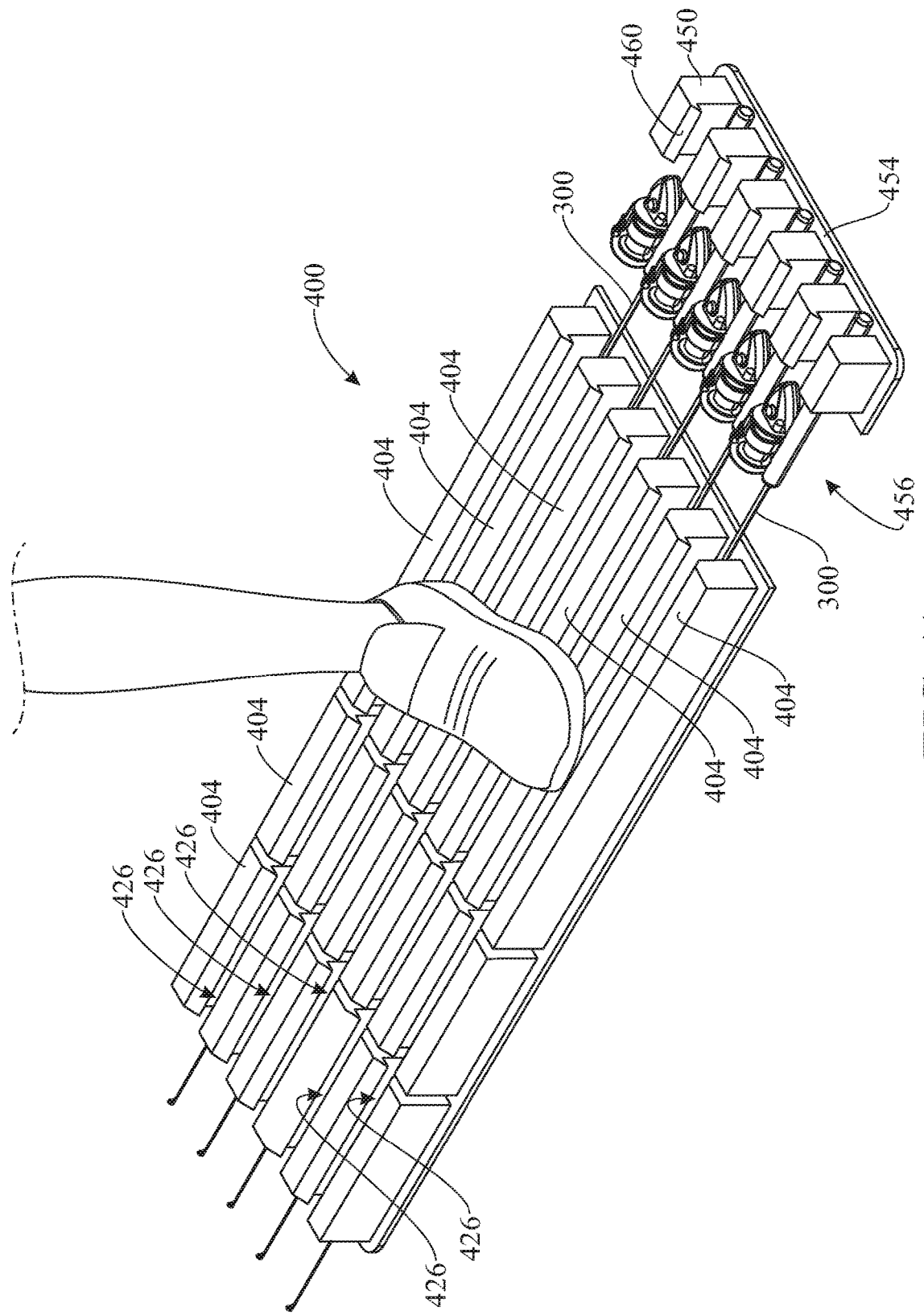
FIG. 11 presents a top proximal perspective view of the assembly of FIG. 10, showing a user standing or walking on the top, load surfaces of the channel members.

The illustrations of FIGS. 7-11 show a fishing pole organizer 400 in accordance with a third illustrative embodiment of the invention. Similarly to the previous embodiments, the fishing pole organizer 400 includes a plurality of channel members 402 formed as elongate bodies, which are arranged in side-by-side, spaced-apart relationship with one another. An upwardly directed channel 426 is defined between each pair of adjacent channel members 402 and is configured to removably receive a fishing pole 300, as shown in FIGS. 10 and 11. As best shown in FIG. 9, the upwardly directed channels 426 are slightly tapered, but alternative embodiments are contemplated as discussed with reference to the previous embodiments.

Each channel member 402 of the present embodiment is formed as a solid block having a top, load surface 404 for the standing or walking thereon of a person. Similarly to the previous embodiments, the load surfaces 404 of the channel members 402 are planar, horizontal, and coplanar with one another, thereby facilitating standing or walking thereon, as shown in FIG. 11. Similarly to previous embodiments, the top, load surfaces 404, and optionally other surfaces of the channel members 402, may be coated or covered with marine carpeting, a rubber or dense foam material, or friction enhancing features such as raised ridges, pyramids, or nubs, or sand impregnated coatings, to prevent individuals from slipping when standing or walking on the fishing pole organizer 400.

Each channel member 402 further includes outer surfaces 418, 420 extending downward from opposite sides of the load surface 404. In the present embodiment, the outer surfaces 418, 420 are planar and vertical. However, alternative embodiments are contemplated in which one or both outer surfaces 418, 420 may be non-planar (e.g., curved, or with ridges, protuberances, etc.) and/or sloped. As best shown in the enlarged portion of FIG. 7, facing outer surfaces 418 and 420 of each pair of adjacent channel members 402 define a corresponding one of the upwardly directed channels 426.

The channel members 402 of the present embodiment further include a wing or flange 442 extending from at least one of the outer surfaces 418, 420 towards the corresponding outer surface 420, 418 of the adjacent channel member 402. The flange 442 contributes to narrow an upper area of the upwardly directed channel 426 to contribute to retain a fishing pole 300 within the channel while still allowing manual removal or insertion of the fishing pole 300 from or into the channel when needed. In the present embodiment, each channel member 402 includes a single flange 442, extending from outer surface 418, while the other outer surface 420 is devoid of a flange; however, alternative embodiments are contemplated in which both outer surfaces may include a flange. Furthermore, the flanges 442 depicted herein are arranged at a top of the channel members 402, and extending from the top load surface 404; however, alternative embodiments are contemplated in which the flanges 442 may be arranged at a top area of the channel near the top load surface 404. Also in the present embodiment, the flanges 442 span along the entire length of the channel members 402 (except for optional transverse channels 444, 446, described hereinafter); however, alternative embodiments are envisaged in which the flanges may be formed as, or include, a plurality of spaced-apart protuberances at discrete lengths or positions along the channel members 402.

The fishing pole organizer 400 of the present embodiment further includes a base plate 440 attached to a bottom side or base 422 of each channel member 402. In some embodiments, the base plate 440 may be adhered and/or fastened using one or more applicable fasteners (e.g. screws, bolts, hook-and-loop fasteners, etc.) to the channel members 402. In other embodiments, the base plate 440 and one or more channel members 402 (and more preferably, all channel members 402) may be integrally-formed into a single-piece unit, such as made of plastic, high density polyurethane, closed cell, fiber-reinforced foam, other materials mentioned heretofore with reference to previous embodiments. For instance, the fishing pole organizer 400 may be routered or milled out of a solid sheet or block of material. In some embodiments, the base plate 440 may be cuttable, and the fishing pole organizer 400 may be selectively downsized by cutting the base plate 440 and thereby removing a selected number of channel members 402. Thus, similarly to previous embodiments, the width of the fishing pole organizer 400 of the present embodiment is adjustable by increasing or decreasing the amount of channel members 402 used.

In some embodiments, an underside of the fishing pole organizer 400 may be provided with a material 441 configured to enhance attachment of the fishing pole organizer 400 to a floor or surface. In non-limiting examples, the material may include a high-friction or non-slip material or an adhesive. In the present embodiment, as shown in FIG. 8, the aforementioned material 441 is provided on an underside of the base plate 440.

As shown in FIG. 7, the fishing pole organizer 400 may further comprise a plurality of proximal blocks 450 arranged in longitudinally-spaced-apart relationship with the channel members 402, and separated from the channel members 402 by a clearance or gap 456. The plurality of proximal blocks 450 correspond with the plurality of channel members 402, and are arranged in spaced-apart relationship with one another defining a space 452 between each pair of adjacent proximal blocks 450 that corresponds with a respective upwardly directed channel 426. The space 452, which may be wider than the upwardly directed channel 426, and especially wider than a distal end of the upwardly directed channel 426, is configured to receive a proximal end of a handle section 302 of a fishing pole 300 (FIG. 10) which is received in the corresponding upwardly directed channel 426. The proximal blocks 450 are constructed with a significantly shorter length but may be otherwise formed similarly or identically to the channel members 402, an optional base plate 454 interconnecting the proximal blocks 450, an optional bottom adhesive or non-slip material 458, and/or an optional flange 460.

The illustrations of FIGS. 10 and 11 show the fishing pole organizer 400 of the present embodiment being used to store a set of fishing poles 300 in a manner that reduces clutter and provides more space on boat decks, and safeguards the fishing poles 300 from being trampled on. As shown, the progressively narrowing fishing poles 300 are received within the tapered upwardly-directed channel members 426, while the relatively wider handle sections 302 and reel mechanisms 304 are arranged within the gap 456 between the channel members 402 and the proximal blocks 450, and the proximal end of each handle section 302 is received within a corresponding space 452 between a pair of adjacent proximal blocks 550. The tapered configuration of each space 452 and corresponding upwardly directed channel 426, together with the clearance or gap 456, allows to snugly and safely receive the fishing poles 300 and also minimize the overall footprint of the fishing pole organizer 400.

Furthermore, in the example of use shown in FIGS. 10 and 11, the fishing poles 300 being stored in the fishing pole organizer 400 are longer than the upwardly open channels 426 and protrude distally therefrom. In other examples of use, this same fishing pole organizer 400 could store shorter or even longer fishing poles, as the distal end of each upwardly open channel 426 is open and thus allows the fishing poles to optionally protrude outward of the channel members 402. Thus, a further advantage of the fishing pole organizer of the present embodiment is the ability for a same fishing pole organizer to accommodate fishing poles of various lengths (in addition to fishing poles of various widths).

Notwithstanding, there may be circumstances where it is necessary to shorten the lengths of each channel member 402, such as to accommodate shorter fishing poles 300 or adjust the size of the fishing rod organizer 400 to a limited space available on a boat deck. For this purpose, the fishing rod organizer 400 may include one or more transverse channels 444, 446 extending from a left side to a right side of the fishing rod organizer and from the top, load surfaces 404 of the channel members 402 to the base plate 440. For instance, the present embodiment specifically includes two transverse channels 444, 446 arranged in different longitudinal positions along the fishing pole organizer 400. The one or more transverse channels 444, 446 may be positioned to allow selective downsizing of the fishing pole organizer 400 to different sizes and/or shapes corresponding to different boat models. In different embodiments, each transverse channel 444 may form an angle equal or different to 90 degrees with a longitudinal direction of the fishing pole organizer 400. For instance, in the present embodiment, the transverse channels 444, 446 are parallel to one another and perpendicular to the longitudinal direction of the fishing rod organizer 400. In other examples, the transverse channels may not be parallel to each other and may be formed at varying angles relative to the longitudinal direction of the fishing rod organizer, such as to accommodate to different boat models.

Figure 12:
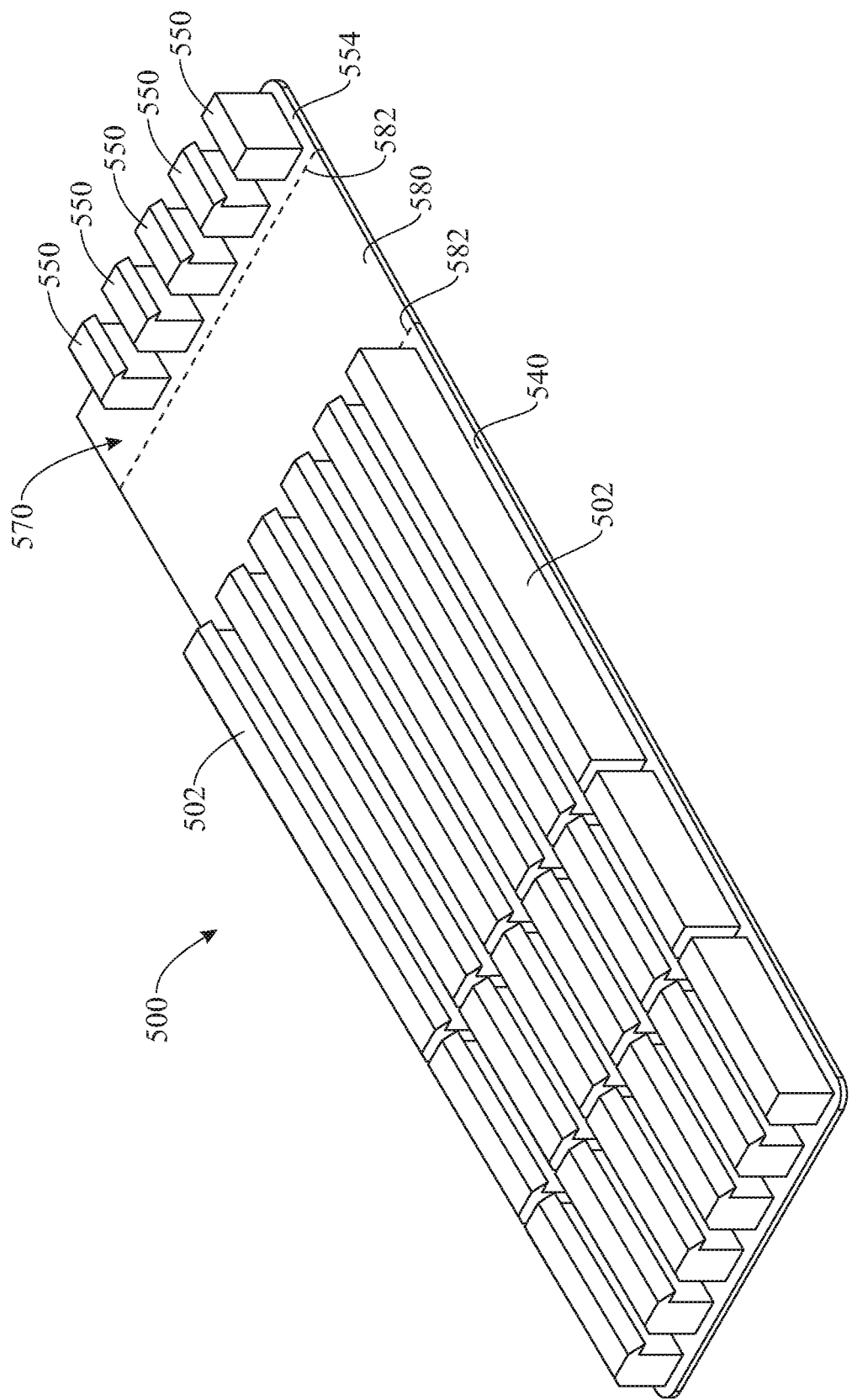
FIG. 12 presents a top isometric view of a fishing pole organizer in accordance with a fourth illustrative embodiment of the present invention, the fishing pole organizer comprising a plurality of channel members and a plurality of proximal blocks corresponding to the plurality of channel members, wherein the channel members and proximal blocks are interconnected by a single base plate.

The illustration of FIG. 12 shows a fishing pole organizer 500 in accordance with variation of the embodiment of FIGS. 7-11. As shown, the fishing pole organizer 500 is such that the number of proximal blocks 550 does not match the number of channel members 402, and instead includes one proximal block 450 less than the number of channel members 402. This configuration may facilitate installing the fishing pole organizer 500 in a boat deck or other setting having higher space restrictions. For example, a space 570 provided in lieu of the (missing) proximal block may be used to accommodate a relatively more curved sidewall or other prominent structural element on the boat.

The fishing pole organizer 500 further comprises a base plate section 580 extending from the base plate 540 beneath the channel members 502 and the base plate 554 beneath the proximal blocks 550. In some embodiments, the base plate section 580 may be cuttable to facilitate downsizing and customization of the fishing pole organizer 500. Alternatively or additionally, the base plate section 580 may be provided with one or more transverse tear sections 582 which allow cutting or tearing the base plate section 580 along predetermined lines to downsize the fishing pole organizer 500 to predetermined sizes which may correspond, for instance, to available spaces provided in different boat models. The one or more transverse tear sections 582, which may or may not be parallel to one another, may each be perpendicular or non-perpendicular to a longitudinal direction of the fishing pole organizer 500.

Further embodiments are contemplated to those shown and described herein. For instance, the shape of the fishing pole organizer may be mirrored to fit into a left or a right side of a boat deck. Furthermore, the fishing pole organizer may include a handle that is integral with, or attached separately to, any outer wall surface of any channel member to facilitate carrying and transporting the channel members, or the fishing pole organizer as a single unit when channel members are attached together. Advertising, logos, images, indicators, characters, numbers, or any other indicia may be disposed on any surface of any channel member, or on any surface of any stiffener (when included).

In addition, further uses of the invention are contemplated. For example, the fishing pole organizer, and most especially, the embodiments with interconnected elongated channel members, may be removed from a boat and placed elsewhere for storage with the fishing poles housed therein. For instance, the fishing pole organizer may be placed or hung against a wall with the fishing poles inside.

While the preferred embodiments of the invention have been described above, it will be recognized and understood that various modifications can be made in the invention and the appended claims are intended to cover all such modifications which may fall within the spirit and scope of the invention.

What is claimed is:

1. A fishing pole organizer for storing and organizing one or more fishing poles on a boat deck, said fishing pole organizer comprising:
    a plurality of interconnected, elongated channel members, the plurality of elongated channel members elongately formed along a horizontal and proximal-to-distal, longitudinal direction, the elongated channel members arranged in side-by-side and spaced-apart relationship with one another along a horizontal and left-to-right, transverse direction generally perpendicular to the longitudinal direction defining a plurality of upwardly directed channels; wherein
    each upwardly directed channel of the plurality of upwardly directed channels is formed between transversely adjacent elongated channel members of the plurality of elongated channel members and is configured to receive a fishing pole therein through a respective elongated top opening of said each upwardly directed channel such that the fishing pole extends generally longitudinally along said each upwardly directed channel; wherein
    the fishing pole organizer is configured to adopt a working configuration in which:
        the fishing pole organizer is arranged resting on a generally horizontal surface and the respective elongated top opening of said each upwardly directed channel is oriented upward and arranged opposite to the generally horizontal surface, and further in which,
        the plurality of elongated channel members observed in top plan view is tapered in the longitudinal direction from a proximal end of the plurality of elongated channel members to a distal end of the plurality of elongated channel members, with said proximal end of the plurality of elongated channel members being wider than said distal end of the plurality of elongated channel members, and each upwardly directed channel observed in top plan view is tapered in the longitudinal direction from a proximal end of said each upwardly directed channel to a distal end of said each upwardly directed channel, with said proximal end of said each upwardly directed channel being wider than said distal end of said each upwardly directed channel.

2. The fishing pole organizer of claim 1, wherein each channel member comprises a planar top surface extending along the length of the channel member, and further wherein the planar top surfaces of the plurality of elongated channel members arranged in side-by-side and spaced-apart relationship are configured to allow standing and walking thereon.

3. The fishing pole organizer of claim 1, wherein the channel members comprise respective flanges that each extend into a respective upwardly directed channel of the plurality of upwardly directed channels, wherein each flange is configured to partially close each upwardly directed channel and retain a fishing pole within each upwardly directed channel.

4. The fishing pole organizer of claim 1, wherein the channel members are formed as separate bodies and are selectively repositionable relative to one another to vary a width or shape of each upwardly directed channel.

5. The fishing pole organizer of claim 1, wherein the plurality of elongated channel members is carried by a base plate, wherein the base plate is attached to a bottom of the plurality of channel members and interconnects the plurality of channel members.

6. The fishing pole organizer of claim 5, wherein the base plate is separable to remove at least one channel member and thereby downsize the fishing pole organizer.

7. The fishing pole organizer of claim 6, wherein the base plate is cuttable.

8. The fishing pole organizer of claim 5, wherein the plurality of elongated channel members and the base plate are integrally-formed into a single-piece unit.

9. The fishing pole organizer of claim 5, further comprising at least one transverse channel extending across the plurality of elongated channel members, from a top of the plurality of elongated channel members to the base plate.

10. The fishing pole organizer of claim 9, wherein the at least one transverse channel comprises two or more transverse channels arranged at different longitudinal positions along the fishing pole organizer.

11. The fishing pole organizer of claim 1, further comprising a plurality of proximal blocks arranged facing, and spaced apart from, a proximal end of the plurality of elongated channel members, wherein the proximal blocks define a plurality of spaces, wherein each space is formed between adjacent proximal blocks and faces a corresponding upwardly directed channel, and further wherein each space is configured to receive a proximal end of a handle section of a fishing pole in turn received within the corresponding upwardly directed channel.

12. The fishing pole organizer of claim 11, wherein each space is wider than the proximal end of the corresponding upwardly directed channel.

13. The fishing pole organizer of claim 11, wherein the plurality of proximal blocks is carried by a first base plate, wherein the first base plate is attached to a bottom of the plurality of proximal blocks and interconnects the plurality of proximal blocks.

14. The fishing pole organizer of claim 13, wherein the plurality of elongated channel members is carried by a second base plate, wherein the second base plate is attached to a bottom of the plurality of base members and interconnects the plurality of base members, and further wherein the second base plate is connected to the first base plate by a base plate section.

15. The fishing pole organizer of claim 14, wherein the base plate section comprises at least one tear section configured to facilitate tearing the base plate to detach the plurality of elongated channel members from the plurality of proximal blocks.

\* \* \* \* \*